US009999105B2

(12) United States Patent
Liu

(10) Patent No.: US 9,999,105 B2
(45) Date of Patent: Jun. 12, 2018

(54) BACKLIGHT MODULE, CURVED-SURFACE DISPLAY DEVICE, AND LIGHT SOURCE ADJUSTMENT METHOD FOR BACKLIGHT MODULE

(71) Applicant: BOE TECHNOLOGY GROUP CO., LTD., Beijing (CN)

(72) Inventor: Qing Liu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 53 days.

(21) Appl. No.: 15/102,214

(22) PCT Filed: Sep. 29, 2015

(86) PCT No.: PCT/CN2015/091007
§ 371 (c)(1),
(2) Date: Jun. 6, 2016

(87) PCT Pub. No.: WO2016/188002
PCT Pub. Date: Dec. 1, 2016

(65) Prior Publication Data
US 2017/0142793 A1 May 18, 2017

(30) Foreign Application Priority Data
May 28, 2015 (CN) .......................... 2015 1 0282612

(51) Int. Cl.
H05B 33/08 (2006.01)
G02F 1/1335 (2006.01)

(52) U.S. Cl.
CPC ... *H05B 33/0845* (2013.01); *G02F 1/133603* (2013.01); *G02F 2001/133612* (2013.01)

(58) Field of Classification Search
CPC ................ H05B 33/0845; H05B 33/08; G02F 1/133603; G02F 2001/133612;
(Continued)

(56) References Cited

U.S. PATENT DOCUMENTS 8,979,294 B2 * 3/2015 An ..................... G02F 1/133603
362/249.02
2014/0078720 A1 3/2014 An et al.
(Continued)

FOREIGN PATENT DOCUMENTS

CN 103730062 A 4/2014
CN 104143319 A 11/2014
(Continued)

OTHER PUBLICATIONS

First Office Action regarding Chinese Application No. 201510282612.9, dated Aug. 2, 2017. Translation provided by Dragon Intellectual Property Law Firm.
(Continued)

Primary Examiner — Bao Q Truong
(74) Attorney, Agent, or Firm — Harness, Dickey & Pierce, P.L.C.

(57) ABSTRACT

The present disclosure provides a backlight module, a curved-surface display device, and a light source adjustment method for the backlight module. The backlight module includes an optical assembly at a side of a light-entering surface of the curved-surface display panel; a light-emitting assembly at a side of the optical assembly away from the curved-surface display panel, and including a plurality of point light sources on a bottom plate; and a control mechanism configured to control states of the point light sources of the light-emitting assembly at different regions of the bottom plate, so as to gradually change output light amounts of the light-emitting assembly at different regions in accordance with a curved surface of the curved-surface display panel.

15 Claims, 2 Drawing Sheets

(58) Field of Classification Search
CPC ............ G02F 1/1335; G02F 1/133608; G02F 1/133611; G09G 3/34; G09G 3/3406; G09G 3/342; F21V 14/00
See application file for complete search history.

(56) References Cited

U.S. PATENT DOCUMENTS

| | | |
|---|---|---|
| 2015/0253623 A1 | 9/2015 | Lee et al. |
| 2016/0044776 A1* | 2/2016 | Park .................. H05K 1/181 |
| | | 362/97.1 |
| 2016/0357066 A1 | 12/2016 | Liu et al. |

FOREIGN PATENT DOCUMENTS

| | | |
|---|---|---|
| CN | 104317092 A | 1/2015 |
| CN | 204101849 U | 1/2015 |
| JP | 2004145328 A | 5/2004 |

OTHER PUBLICATIONS

Written Opinion of the International Searching Authority and International Search Report for International Application No. PCT/CN2015/091007, dated Jan. 28, 2016. Translation provided by Dragon Intellectual Property Law Firm.
Second Chinese Office Action regarding Application No. 201510282612.9 dated Feb. 1, 2018. Translation provided by Dragon Intellectual Property Law Firm.

* cited by examiner

BACKLIGHT MODULE, CURVED-SURFACE DISPLAY DEVICE, AND LIGHT SOURCE ADJUSTMENT METHOD FOR BACKLIGHT MODULE

CROSS-REFERENCE TO RELATED APPLICATIONS

The present application is the U.S. national phase of PCT Application No. PCT/CN2015/091007 filed on Sep. 29, 2015, which claims a priority of the Chinese patent application No. 201510282612.9 filed on May 28, 2015, the entire disclosures of which are incorporated herein by reference in their entirety.

TECHNICAL FIELD

The present disclosure relates to the field of display technology, in particular to a backlight module, a curved-surface display device, and a light source adjustment method for the backlight module.

BACKGROUND

Along with the development of the photoelectric and semiconductor technologies, flat-panel displays are flourishing nowadays. Among the various flat-panel displays, a liquid crystal display (LCD) has become a mainstream in the market due to its advantages such as high space utilization, low power consumption, being free of radiation and low electromagnetic interference.

Usually, the LCD includes a liquid crystal panel and backlight module (BL). Because the LCD is not self-luminous, the backlight module needs to be arranged below the liquid crystal panel, so as to serve as an area light source desired for the liquid crystal panel, thereby to enable the liquid crystal panel to display an image.

Recently, many manufacturers have launched their curved-surface LCDs. Generally speaking, it is able for the curved-surface LCD to provide an optimal viewing effect from an edge to a center of its screen, but it is impossible for a common flat-panel LCD to provide an ideal viewing effect at the edge of its screen. To be specific, the entire screen of the curved-surface LCD is of an arc shape protruded in a direction opposite to a user, so as to provide a panorama image, i.e., to provide the user with an identical viewing effect at both the center and the edge of the screen. In addition, when the user is desired to view the image at a small distance from the screen, it is able to prevent the off-axis image distortion. Further, it is able for the user to view the image at a long distance from the screen of the curved-surface LCD, so as to improve the user experience.

In the case that a conventional backlight source with a flat light-emitting surface is adopted by the curved-surface LCD, light beams emitted by the backlight source and distributed in a plane may become uneven after they pass through the curved-surface liquid crystal panel. Hence, a backlight source with a curved light-emitting surface needs to be adopted by the curved-surface liquid crystal panel.

Most of the conventional curved-surface LCDs each include a curved-surface backlight module, so as to provide a backlight source for the curved-surface liquid crystal panel. The curved-surface backlight module includes a light guide plate and a back plate each having a curved shape corresponding to a curvature radius of the curved-surface liquid crystal panel. Correspondingly, a plurality of light-emitting diodes (LEDs) is arranged along a curved surface of the back plate. As a result, the curved-surface backlight modules with different curved shapes need to be provided for the curved-surface liquid crystal panels with different curvature radii, and thereby the production cost will increase.

SUMMARY

An object of the present disclosure is to provide a backlight module, a curved-surface display device, and a light source adjustment method for the backlight module, so as to provide the light source for curved-surface display panels with different curvature radii through the same backlight module, thereby to reduce the production cost and ensure the uniformity of light beams.

In one aspect, the present disclosure provides in some embodiments a backlight module for providing a light source for a curved-surface display panel, including: an optical assembly at a side of a light-entering surface of the curved-surface display panel; a light-emitting assembly at a side of the optical assembly away from the curved-surface display panel, and including a plurality of point light sources on a bottom plate; and a control mechanism configured to control states of the point light sources of the light-emitting assembly at different regions of the bottom plate, so as to gradually change output light amounts of the light-emitting assembly at different regions in accordance with a curved surface of the curved-surface display panel.

Alternatively, the curved-surface display panel has a curved surface curved in a first direction, and distances between the curved-surface display panel and the light-emitting assembly increase gradually from a middle portion of the curved-surface display panel to a peripheral portion of the curved-surface display panel in the first direction. The control mechanism is configured to control light-emitting states of the point light sources of the light-emitting assembly at different regions of the bottom plate in accordance with the curved surface of the curved-surface display panel, so that light intensities of the light-emitting assembly increase gradually from a middle region to a peripheral region of the bottom plate in the first direction.

Alternatively, the control mechanism is configured to control driving currents applied to the point light sources of the light-emitting assembly at different regions of the bottom plate in accordance with a curvature radius of the curved-surface display panel and a predetermined correspondence, so that the driving currents applied to the point light sources of the light-emitting assembly increase gradually from the middle region to the peripheral region of the bottom plate in the first direction.

Alternatively, the plurality of point light sources is arranged in a matrix form, and the point light sources in the first direction are arranged symmetrically on the bottom plate in N columns. The control mechanism is configured to control the driving currents for the point light sources in an $n^{th}$ column and an $(N-n+1)^{th}$ column in accordance with the curvature radius of the curved-surface display panel and the predetermined correspondence using an equation $$I_n = I_{(N-n+1)} = \left(1 + \frac{\sqrt{\left(R * \sin^{-1}\frac{\left(\frac{L}{2} - r\right)}{R}\right)^2 - \left(\frac{L}{2} - r\right)^2}}{H}\right) * I_0,$$

where n represents a serial number of the column in which the point light sources are located in the first direction and which is counted from a first edge of the bottom plate, R represents the curvature radius of the curved-surface display panel, r represents a distance between the point light sources in the $n^{th}$ column and the first edge of the bottom plate in the first direction, $I_n$ represents the driving current applied to the point light sources in the $n^{th}$ column, $I_{(N-n+1)}$ represents the driving current applied to the point light sources in the $(N-n+1)^{th}$ column, $I_0$ represents the driving current applied to the point light source at a position corresponding to a point of the curved-surface display panel closest to the light-emitting assembly, H represents a distance between the light-emitting assembly and the point of the curved-surface display panel closest to the light-emitting assembly, and L represents a length of the bottom plate in the first direction.

Alternatively, the plurality of point light sources is arranged on the bottom plate in a matrix form and spaced apart from each other at an identical interval. Distances between each of the point light sources in a first column or an $N^{th}$ column and a corresponding edge of the bottom plate in the first direction is P/2, and P represents a distance between the two adjacent columns of point light sources. The control mechanism is configured to control the driving currents for the point light sources in the $n^{th}$ column and the $(N-n+1)^{th}$ column in accordance with the curvature radius of the curved-surface display panel and the predetermined correspondence using an equation $$I_n = I_{(N-n+1)} = \left(1 + \frac{\sqrt{\left(R*\sin^{-1}\frac{\left(\frac{L}{2}-(n-1)p-\frac{p}{2}\right)}{R}\right)^2 - \left[\frac{L}{2}-(n-1)p-\frac{p}{2}\right]^2}}{H}\right)*I_0,$$

where n represents a serial number of the column in which the point light sources are located in the first direction and which is counted from a first edge of the bottom plate, R represents the curvature radius of the curved-surface display panel, $I_n$ represents the driving current applied to the point light sources in the $n^{th}$ column, $I_{(N-n+1)}$ represents the driving current applied to the point light sources in the $(N-n+1)^{th}$ column, $I_0$ represents the driving current applied to the point light source at a position corresponding to the point of the curved-surface display panel closest to the light-emitting assembly, H represents a distance between the light-emitting assembly and the point of the curved-surface display panel closest to the light-emitting assembly, and L represents a length of the bottom plate in the first direction.

Alternatively, the curved-surface display panel has a curved surface curved in a first direction, and distances between the curved-surface display panel and the light-emitting assembly increase gradually from a middle portion of the curved-surface display panel to a peripheral portion of the curved-surface display panel in the first direction. The control mechanism is configured to control on and off states of the point light sources of the light-emitting assembly at different regions of the bottom plate in accordance with the curved surface of the curved-surface display panel, so that the number of the point light sources of the light-emitting assembly in the on state increases gradually from a middle region to a peripheral region of the bottom plate in the first direction.

Alternatively, the curved-surface display panel has a curved surface curved in a first direction, and distances between the curved-surface display panel and the light-emitting assembly decrease gradually from a middle portion of the curved-surface display panel to a peripheral portion of the curved-surface display panel in the first direction. The control mechanism is configured to control light-emitting states of the point light sources of the light-emitting assembly at different regions of the bottom plate in accordance with the curved surface of the curved-surface display panel, so that light intensities of the light-emitting assembly decrease gradually from a middle region to a peripheral region of the bottom plate in the first direction.

In another aspect, the present disclosure provides in some embodiments a light source adjustment method for the above-mentioned backlight module, including a step of controlling states of point light sources of a light-emitting assembly at different regions of a bottom plate, so as to gradually change output light amounts of the light-emitting assembly at the regions in accordance with a curved surface of a curved-surface display panel.

Alternatively, the step of controlling the states of the point light sources of the light-emitting assembly at different regions of the bottom plate includes, in the case that the curved-surface display panel has a curved surface curved in a first direction, and distances between the curved-surface display panel and the light-emitting assembly increase gradually from a middle portion of the curved-surface display panel to a peripheral portion of the curved-surface display panel in the first direction, controlling light-emitting states of the point light sources of the light-emitting assembly at different regions of the bottom plate in accordance with the curved surface of the curved-surface display panel, so that light intensities of the light-emitting assembly increase gradually from a middle region to a peripheral region of the bottom plate in the first direction.

Alternatively, the step of controlling the light-emitting states of the point light sources of the light-emitting assembly at different regions of the bottom plate in accordance with the curved surface of the curved-surface display panel includes controlling driving currents applied to the point light sources of the light-emitting assembly at different regions of the bottom plate in accordance with a curvature radius of the curved-surface display panel and a predetermined correspondence, so that the driving currents applied to the point light sources of the light-emitting assembly increase gradually from the middle region to the peripheral region of the bottom plate in the first direction.

Alternatively, the step of controlling the driving currents applied to the point light sources of the light-emitting assembly at different regions of the bottom plate in accordance with the curvature radius of the curved-surface display panel and the predetermined correspondence includes controlling the driving currents for the point light sources in an $n^{th}$ column and an $(N-n+1)^{th}$ column in accordance with the curvature radius of the curved-surface display panel and the predetermined correspondence using an equation $$I_n = I_{(N-n+1)} = \left(1 + \frac{\sqrt{\left(R*\sin^{-1}\frac{\left(\frac{L}{2}-r\right)}{R}\right)^2 - \left(\frac{L}{2}-r\right)^2}}{H}\right)*I_0,$$

where n represents a serial number of the column in which the point light sources are located in the first direction and which is counted from a first edge of the bottom plate, R represents the curvature radius of the curved-surface display panel, r represents a distance between the point light sources in the $n^{th}$ column and the first edge of the bottom plate in the first direction, $I_n$ represents the driving current applied to the point light sources in the $n^{th}$ column, $I_{(N-n+1)}$ represents the driving current applied to the point light sources in the $(N-n+1)^{th}$ column, $I_0$ represents the driving current applied to the point light source at a position corresponding to a point of the curved-surface display panel closest to the light-emitting assembly, H represents a distance between the light-emitting assembly and the point of the curved-surface display panel closest to the light-emitting assembly, and L represents a length of the bottom plate in the first direction.

Alternatively, the driving currents for the point light sources in the $n^{th}$ column and the $(N-n+1)^{th}$ column are controlled in accordance with the curvature radius of the curved-surface display panel and the predetermined correspondence with an equation $$I_n = I_{(N-n+1)} = \left(1 + \frac{\sqrt{\left(R*\sin^{-1}\frac{\left(\frac{L}{2}-(n-1)p-\frac{p}{2}\right)}{R}\right)^2 - \left[\frac{L}{2}-(n-1)p-\frac{p}{2}\right]^2}}{H}\right)*I_0,$$

where n represents a serial number of the column in which the point light sources are located in the first direction and which is counted from a first edge of the bottom plate, R represents the curvature radius of the curved-surface display panel, $I_n$ represents the driving current applied to the point light sources in the $n^{th}$ column, $I_{(N-n+1)}$ represents the driving current applied to the point light sources in the $(N-n+1)^{th}$ column, $I_0$ represents the driving current applied to the point light source at a position corresponding to the point of the curved-surface display panel closest to the light-emitting assembly, H represents a distance between the light-emitting assembly and the point of the curved-surface display panel closest to the light-emitting assembly, L represents a length of the bottom plate in the first direction, and P represents a distance between the two adjacent columns of point light sources.

Alternatively, the step of controlling the states of the point light sources of the light-emitting assembly at different regions of the bottom plate includes controlling on and off states of the point light sources of the light-emitting assembly at different regions of the bottom plate in accordance with the curved surface of the curved-surface display panel, so that the number of the point light sources of the light-emitting assembly in the on state increases gradually from a middle region to a peripheral region of the bottom plate in the first direction.

Alternatively, the step of controlling the states of the point light sources of the light-emitting assembly at different regions of the bottom plate includes, in the case that the curved-surface display panel has a curved surface curved in a first direction, and distances between the curved-surface display panel and the light-emitting assembly decrease gradually from a middle portion of the curved-surface display panel to a peripheral portion of the curved-surface display panel in the first direction, controlling light-emitting states of the point light sources of the light-emitting assembly at different regions of the bottom plate in accordance with the curved surface of the curved-surface display panel, so that light intensities of the light-emitting assembly decrease gradually from a middle region to a peripheral region of the bottom plate in the first direction.

In yet another aspect, the present disclosure provides in some embodiments a curved-surface display device including a curved-surface display panel and the above-mentioned backlight module.

According to the embodiments of the present disclosure, with respect to the curved-surface display panels with different curvature radii, it is able for the backlight module to adjust the output light amounts of the light-emitting assembly at different regions of the bottom plate, so as to enable the output light amounts to be adapted to the curved surface of the curved-surface display panel, thereby to provide the curved-surface display panel with a uniform curved-surface light source. As compared with a conventional backlight source, it is able to provide the uniform curved-surface light source without bending a component such as a back plate, so as to apply the same backlight module to the curved-surface display panels with different curvature radii, thereby to reduce the production cost.

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure.

In the related art, backlight modules with different curved surfaces need to be adopted by curved-surface display panels with different curvature radii, resulting in an increase in the production cost. The present disclosure provides in some embodiments a backlight module capable of being adapted to the curved-surface display panels with different curvature radii, so as to reduce the production cost.

Figure 1:
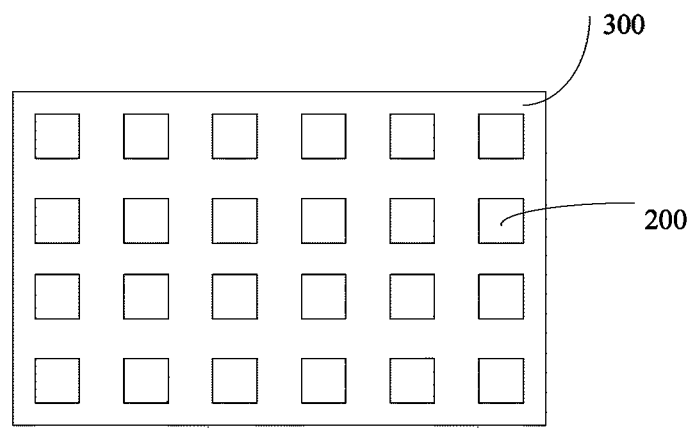
FIG. 1 is a schematic view showing an arrangement mode for point light sources on a bottom plate of a backlight module according to one embodiment of the present disclosure.
Figure 2:
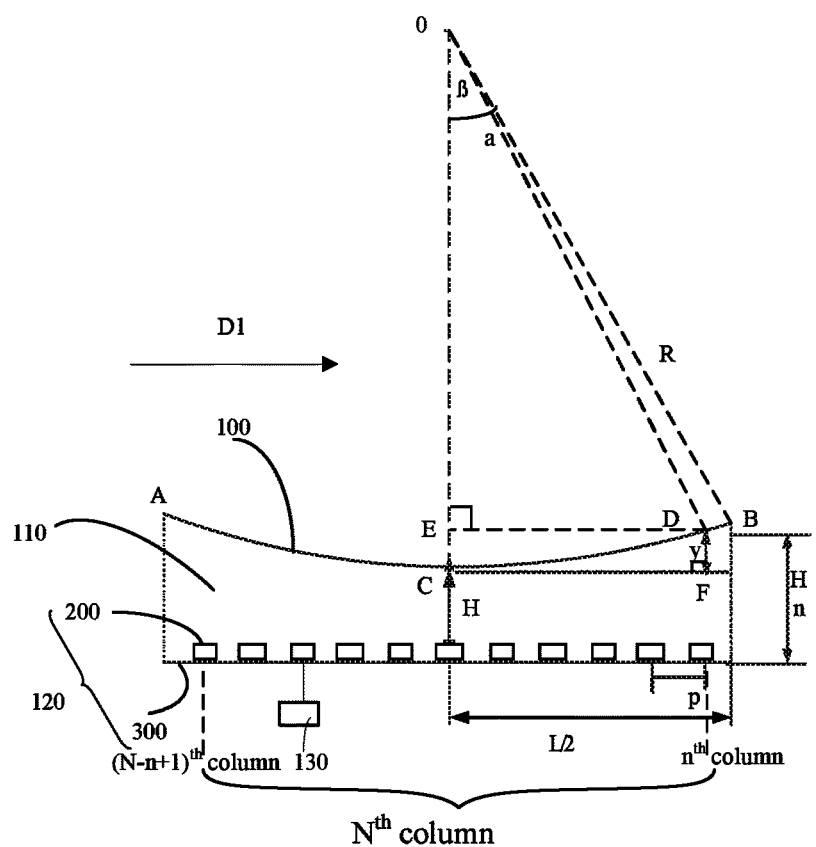
FIG. 2 is a schematic view showing a location relationship between a curved-surface display panel and the backlight module according to one embodiment of the present disclosure.

As shown in FIGS. 1 and 2, the present disclosure provides in some embodiments a backlight module for providing a light source for a curved-surface display panel, including: an optical assembly 110 arranged at a side of a light-entering surface of the curved-surface display panel 100; a light-emitting assembly 120 arranged at a side of the optical assembly 110 away from the curved-surface display panel 100, and including a plurality of point light sources 200 arranged on a bottom plate 300; and a control mechanism 130 configured to control states of the point light sources 200 of the light-emitting assembly at different regions of the bottom plate 300, so as to gradually change output light amounts of the light-emitting assembly at different regions in accordance with a curved surface of the curved-surface display panel 100.

According to the embodiments of the present disclosure, with respect to the curved-surface display panels 100 with different curvature radii, it is able for the backlight module to adjust the output light amounts of the light-emitting assembly at different regions of the bottom plate through the control mechanism, so as to enable the output light amounts to be adapted to the curved surface of the curved-surface display panel 100, thereby to provide the curved-surface display panel 100 with a uniform curved-surface light source. As compared with a conventional backlight source, it is able to provide the uniform curved-surface light source without bending a component such as a back plate, so as to apply the same backlight module to the curved-surface display panels 100 with different curvature radii, thereby to reduce the production cost.

The backlight module in the embodiments of the present disclosure will be described in more details hereinafter.

Alternatively, as shown in FIG. 2, the curved-surface display panel 100 has a curved surface curved in a first direction D1, and distances between the curved-surface display panel 100 and the light-emitting assembly increase gradually from a middle portion of the curved-surface display panel to a peripheral portion of the curved-surface display panel 100 in the first direction.

The control mechanism is configured to control light-emitting states of the point light sources 200 of the light-emitting assembly at different regions of the bottom plate 300 in accordance with the curved surface of the curved-surface display panel 100, so that light intensities of the light-emitting assembly increase gradually from a middle region to a peripheral region of the bottom plate in the first direction.

In the embodiments of the present disclosure, the curved-surface display panel 100 is of a concave surface in the first direction. In the first direction, the middle portion of the curved-surface display panel 100 is closest to the light-emitting assembly, and the peripheral portion of the curved-surface display panel 100 is farthest to the light-emitting assembly. Hence, the output light amount of the light-emitting assembly needs to be small at the middle region of the bottom plate corresponding to the middle portion of the curved-surface display panel, while the output light amount needs to be large at a peripheral region corresponding to the peripheral portion of the curved-surface display panel 100. In addition, the light output light amounts of the light-emitting assembly may increase gradually from the middle region to the peripheral region of the bottom plate in accordance with the curved surface of the curved-surface display panel 100. In this way, it is able to provide the uniform light source for the curved-surface display panel 100.

Figure 3:
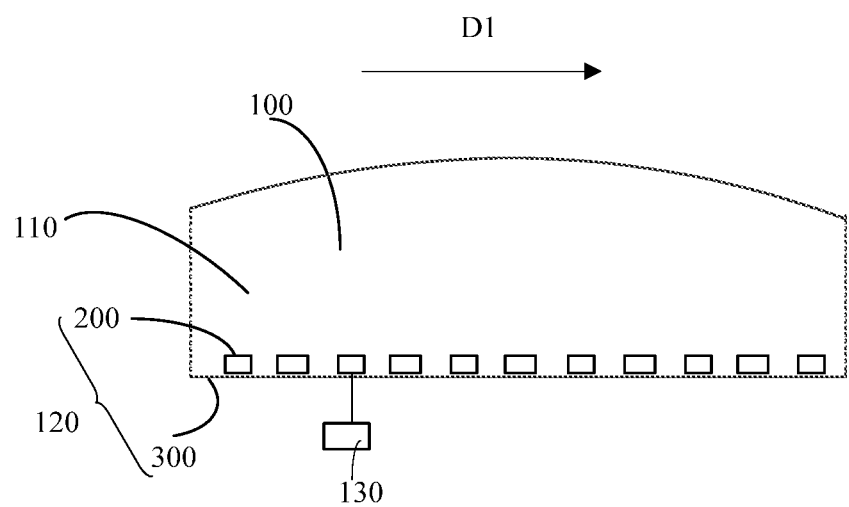
FIG. 3 is a schematic view showing a display device according to one embodiment of the present disclosure.

It should be appreciated that, in the above-mentioned embodiments of the present disclosure, with respect to the curved-surface display panel 100 with a concave surface, the light-emitting states of the point light sources 200 of the light-emitting assembly at different regions of the bottom plate 300 may be controlled, so as to enable the light intensities of the light-emitting assembly to increase gradually from the middle region to the peripheral region of the bottom plate in the first direction, thereby to provide the uniform light source for the curved-surface display panel 100. However, in some other embodiments of the present disclosure, the curved-surface display panel 100 may also be of a surface in any other shapes. For example, as shown in FIG. 3, the curved-surface display panel 100 is of a convex surface, and at this time, the light-emitting states of the point light sources 200 of the light-emitting assembly at different regions of the bottom plate 300 may be controlled, so as to enable the light intensities of the light-emitting assembly to decrease gradually from the middle region to the peripheral region of the bottom plate in the first direction, thereby to provide the uniform light source for the curved-surface display panel 100.

In addition, in the case of controlling the light-emitting states of the point light sources 200 of the light-emitting assembly at different regions in accordance with the curved surface of the curved-surface display panel 100, the light intensities of the point light sources 200 may be controlled in accordance with a curvature radius of the curved-surface display panel 100 and a predetermined correspondence, so that the light intensities of the light-emitting assembly increase gradually from the middle region to the peripheral region of the bottom plate in the first direction. It should be appreciated that, in some other embodiments of the present disclosure, the output light amounts of the light-emitting assembly may be controlled in any other ways.

For example, in an alternative embodiment of the present disclosure, on and off states of the point light sources 200 of the light-emitting assembly at different regions of the bottom plate 300 may be controlled in accordance with the curvature radius of the curved-surface display panel 100. In the case that the curved-surface display panel 100 is of a concave surface, the number of the point light sources 200 of the light-emitting assembly in the on state may increase gradually from the middle region to the peripheral region of the bottom plate in the first direction in accordance with the curvature radius of the curved-surface display panel 100, so as to provide the uniform light source for the curved-surface display panel 100. Similarly, in the case that the curved-surface display panel 100 is of a convex surface, the number of the point light sources 200 of the light-emitting assembly in the on state may decrease gradually from the middle region to the peripheral region of the bottom plate in the first direction, so as to provide the uniform light source for the curved-surface display panel 100.

In addition, in some other embodiments of the present disclosure, the output light amounts of the light-emitting assembly may be adjusted in accordance with the curved surface of the curved-surface display panel 100 in any other ways. For example, the point light sources 200 may be movably arranged on the bottom plate 300, and the control mechanism may be configured to adjust a distribution state of the point light sources at different regions of the bottom plate 300 in accordance with the curvature radius of the curved-surface display panel 100, so that the number of the point light sources 200 increases gradually from the middle region to the peripheral region of the bottom plate in the first direction.

In a word, the control mechanism is configured to gradually change the output light amounts of the light-emitting assembly at different regions in accordance with the curvature radius of the curved-surface display panel 100, so as to provide the uniform light source for the curved-surface display panel 100.

Alternatively, the control mechanism is configured to control driving currents applied to the point light sources of the light-emitting assembly at different regions of the bottom plate in accordance with a curvature radius of the curved-surface display panel 100 and a predetermined correspondence, so that the driving currents applied to the point light sources 200 of the light-emitting assembly increase gradually from the middle region to the peripheral region of the bottom plate 300 in the first direction.

Through controlling the driving currents applied to the point light sources 200, it is able to control the output light amount of the light-emitting assembly at different regions in a convenient and accurate manner.

In addition, a correspondence between the curvature radius of the curved-surface display panel 100 and the driving currents applied to the point light sources 200 will be given as follows, so as to enable the backlight module to be adapted to the curved-surface display panel 100 with different curvature radii. It should be appreciated that, the following description is given by taking the curved-surface display panel 100 with a concave surface as an example.

FIG. 1 is a top view of the point light sources of the light-emitting assembly, and FIG. 2 is a schematic view showing the location relationship between the backlight module and the curved-surface display panel 100.

It is assumed that an arc AB of the curved-surface display panel 100 in the first direction has a length of L1, the curvature radius of the curved-surface display panel 100 is R, and a corresponding central angle is $2\alpha$. As shown in FIG. 2, geometrically, the following equation (I)

$$2\alpha = \frac{L1}{R}$$

may be satisfied among the central angle $2\alpha$, the length L1 of the arc AB and the curvature radius R.

It is assumed that a distance between the light-emitting assembly and a point C of the curved-surface display panel 100 closest to the light-emitting assembly is H, the point light sources 200 are arranged on the bottom plate 300 in a matrix form, a distance between the point light sources in an $n^{th}$ column and a first edge of the bottom plate 300 in the first direction is r, and light flux between the light-emitting assembly and the point C of the curved-surface display panel 100 closest to the light-emitting assembly is Q.

Because the curved-surface display panel 100 is of a concave surface, a distance between a point D of the curved-surface display panel 100 and the light-emitting assembly is greater than a distance between the point C and the light-emitting assembly. At this time, an optical distance between the point D and the light-emitting assembly is larger than that between the point C and the light-emitting assembly, so the desired light flux needs to increase too.

As shown in FIG. 2, in the case that the optical distance between the point D and the light-emitting assembly is increased by y, the desired light flux Q' at the point D may calculated using an equation (II)

$$Q' = \left(\frac{H+y}{H}\right) * Q.$$

Hence, in the case that the point light source 200 is arranged on the bottom plate 300 at a position corresponding to the point D, the driving current applied to the point light source 200 may be adjusted to be (H+y)/H times the driving current applied to the point light source at a position corresponding to the point C. In other words, the driving currents for the point light sources 200 at different regions may be acquired, as long as the optical distances between the points on the curved-surface display panel 100 and the light-emitting assembly are known.

The optical distance between each point on the curved-surface display panel 100 and the light-emitting assembly may be calculated as follows.

As shown in FIG. 2, the point light sources 200 are arranged in a matrix form, and the point light sources 200 in the first direction are arranged symmetrically on the bottom plate 300 in N columns. For the point light sources 200 in an $n^{th}$ column counted from a first edge of the bottom plate corresponding to a point B on the curved-surface display panel 100, the optical distance between a point D on the curved-surface display panel 100 corresponding to the point light sources 200 in the $n^{th}$ column and the light-emitting assembly is increased by y relative to the optical distance between the point C, where the curved-surface display panel 100 is closest to the light-emitting assembly, and the light-emitting assembly, and a central angle corresponding to the point D is $2\beta$.

According to equation (I), an arc CD has a length of $R*\beta$, and a chord CD has a length approximately equal to the length of the arc CD. Assumed that the bottom plate has a length of L, a side ED of a right triangle $\Delta$ED in FIG. 2 is approximately equal to $$\frac{L}{2} - r.$$

Hence, $$R * \sin\beta = \frac{L}{2} - r,$$

and thereby an equation (III)

$$\beta = \sin^{-1}\frac{\left(\frac{L}{2} - r\right)}{R}$$

may be obtained.

Then, according to a right triangle $\Delta$CDF in FIG. 2, an equation (IV)

$$y = \sqrt{(R\beta)^2 - \left(\frac{L}{2} - r\right)^2} = \sqrt{\left(R*\sin^{-1}\frac{\left(\frac{L}{2} - r\right)}{R}\right)^2 - \left(\frac{L}{2} - r\right)^2}$$

may be obtained.

According to the equation (IV), the distance $H_n$ between the point light sources 200 in the $n^{th}$ column and the curved-surface display panel 100 may be calculated as follows:

$$H_n = H + y = H + \sqrt{\left(R*\sin^{-1}\frac{\left(\frac{L}{2} - r\right)}{R}\right)^2 - \left(\frac{L}{2} - r\right)^2}.$$

In conjunction with the equation (II), the driving current applied to the point light sources 200 in the $n^{th}$ column may be adjusted to be (H+y)/H times the driving current applied to the point light source 200 at a position corresponding to the point C. In other words, the driving current $I_n$ applied to the point light sources 200 in the $n^{th}$ column may calculated using an equation (V)

$$I_n = \left(1 + \frac{\sqrt{\left(R*\sin^{-1}\frac{\left(\frac{L}{2}-r\right)}{R}\right)^2 - \left(\frac{L}{2}-r\right)^2}}{H}\right)*I_0,$$

where $I_n$ represents the driving current applied to the point light sources 200 in the $n^{th}$ column, and $I_0$ represents the driving current applied to the point light source at a position corresponding to the point C of the curved-surface display panel 100 closest to the light-emitting assembly.

As shown in FIG. 2, the point light sources 200 are arranged in a matrix form, and the point light sources 200 in the first direction are arranged symmetrically on the bottom plate 300 in N columns, the driving current applied to the point light sources 200 in an $(N-n+1)^{th}$ column is identical to that applied to the point light sources 200 in the $n^{th}$ column.

Alternatively, the plurality of point light sources 200 is arranged on the bottom plate 300 in a matrix form and spaced apart from each other at an identical interval. Distances between the outermost point light sources 200 and corresponding edges of the bottom plate 300 in the first direction are each P/2, and P represents a distance between the two adjacent columns of point light sources 200. As shown in FIG. 2, according to the equation (V), $$r = (n-1)p + \frac{p}{2},$$

where n represents a serial number of the column in which the point light sources 200 are located in the first direction and which is counted from an edge of the bottom plate 300.

Hence, the driving current applied to the point light sources 200 in the $n^{th}$ column may be calculated using an equation (VI)

$$I_n = \left(1 + \frac{\sqrt{\left(R*\sin^{-1}\frac{\left(\frac{L}{2}-(n-1)p-\frac{p}{2}\right)}{R}\right)^2 - \left[\frac{L}{2}-(n-1)p-\frac{p}{2}\right]^2}}{H}\right)*I_0,$$

where $I_n$ represents the driving current applied to the point light sources 200 in the $n^{th}$ column, and $I_0$ represents the driving current applied to the point light source 200 at a position corresponding to the point C of the curved-surface display panel closest to the light-emitting assembly.

In a word, the driving currents applied to the point light sources 200 of the light-emitting assembly at different regions may be controlled in accordance with the curvature radius R of the curved-surface display panel 100 and the predetermined correspondence, i.e. the equation (VI), so as to enable the output light amounts of the light-emitting assembly to be adapted to the curved surface of the curved-surface display panel 100, thereby to provide the uniform light source.

It should be appreciated that, the above way of accurately controlling the light quantity of the light-emitting assembly in accordance with the correspondence between the driving current and the curvature radius is merely for illustrative purposes. During the actual application, the output light mount of the light-emitting assembly may also be controlled in accordance with any other correspondences, which will not be particularly defined herein.

It should be further appreciated that, the optical assembly may include an optical membrane, which may be deformed adaptively in accordance with the curved-surface of the curved-surface display panel 100 during the assembly. In other words, during the assembly of a curved-surface display device, a shape of the optical membrane may be adapted to the curved surface of the curved-surface display panel 100 and may have a curvature radius identical to the curved-surface display panel 100.

The present disclosure further provides in some embodiments a curved-surface display device including a curved-surface display panel and the above-mentioned backlight module.

The present disclosure further provides in some embodiments a light source adjustment method for the above-mentioned backlight module, so as to achieve the object of the present disclosure. The light source adjustment method includes a step of controlling states of the point light sources 200 of the light-emitting assembly at different regions of the bottom plate 300, so as to gradually change the output light amounts of the light-emitting assembly at different regions in accordance with the curved surface of the curved-surface display panel 100.

Alternatively, the step of controlling the states of the point light sources of the light-emitting assembly at different regions of the bottom plate includes, in the case that the curved-surface display panel 100 has a curved surface curved in a first direction, and distances between the curved-surface display panel 100 and the light-emitting assembly increase gradually from the middle portion of the curved-surface display panel 100 to a peripheral portion of the curved-surface display panel 100 in the first direction, controlling light-emitting states of the point light sources 200 of the light-emitting assembly at different regions of the bottom plate 300 in accordance with the curved surface of the curved-surface display panel 100, so that light intensities of the light-emitting assembly increase gradually from a middle region to a peripheral region of the bottom plate 300 in the first direction.

Alternatively, the step of controlling the light-emitting states of the point light sources 200 of the light-emitting assembly at different regions of the bottom plate 300 in accordance with the curved surface of the curved-surface display panel 100 includes controlling driving currents applied to the point light sources 200 of the light-emitting assembly at different regions of the bottom plate 300 in accordance with a curvature radius of the curved-surface display panel 100 and a predetermined correspondence, so that the driving currents applied to the point light sources 200 of the light-emitting assembly increase gradually from the middle region to the peripheral region of the bottom plate 300 in the first direction.

Alternatively, the step of controlling the driving currents applied to the point light sources of the light-emitting assembly at different regions of the bottom plate in accordance with the curvature radius of the curved-surface display panel and the predetermined correspondence includes controlling the driving currents for the point light sources in an $n^{th}$ column and an $(N-n+1)^{th}$ column in accordance with the curvature radius of the curved-surface display panel and the predetermined correspondence using an equation $$I_n = I_{(N-n+1)} = \left(1 + \frac{\sqrt{\left(R*\sin^{-1}\frac{\left(\frac{L}{2}-r\right)}{R}\right)^2 - \left(\frac{L}{2}-r\right)^2}}{H}\right)*I_0,$$

where n represents a serial number of the column in which the point light sources 200 are located in the first direction and which is counted from a first edge of the bottom plate 300, R represents the curvature radius of the curved-surface display panel 100, r represents a distance between the point light sources 200 in the $n^{th}$ column and the first edge of the bottom plate 300 in the first direction, $I_n$ represents the driving current applied to the point light sources 200 in the $n^{th}$ column, $I_{(N-n+1)}$ represents the driving current applied to the point light sources 200 in the $(N-n+1)^{th}$ column, $I_0$ represents the driving current applied to the point light source 200 corresponding to a point of the curved-surface display panel 100 closest to the light-emitting assembly, H represents a distance between the light-emitting assembly and the point of the curved-surface display panel 100 closest to the light-emitting assembly, and L represents an arc length of the bottom plate 300 in the first direction.

Alternatively, the step of controlling the driving currents applied to the point light sources 200 of the light-emitting assembly at different regions of the bottom plate in accordance with the curvature radius of the curved-surface display panel 100 and the predetermined correspondence includes controlling the driving currents for the point light sources 200 in an $n^{th}$ column and an $(N-n+1)^{th}$ column in accordance with the curvature radius of the curved-surface display panel and the predetermined correspondence using an equation $$I_n = I_{(N-n+1)} =$$

$$\left(1 + \frac{\sqrt{\left(R*\sin^{-1}\frac{\left(\frac{L}{2}-(n-1)p-\frac{p}{2}\right)}{R}\right)^2 - \left[\frac{L}{2}-(n-1)p-\frac{p}{2}\right]^2}}{H}\right)*I_0,$$

where n represents a serial number of the column in which the point light sources 200 are located in the first direction and which is counted from a first edge of the bottom plate 300, R represents the curvature radius of the curved-surface display panel 100, $I_n$ represents the driving current applied to the point light sources 200 in the $n^{th}$ column, $I_{(N-n+1)}$ represents the driving current applied to the point light sources 200 in the $(N-n+1)^{th}$ column, $I_0$ represents the driving current applied to the point light source 200 at a position corresponding to the point of the curved-surface display panel 100 closest to the light-emitting assembly, H represents a distance between the light-emitting assembly and the point of the curved-surface display panel 100 closest to the light-emitting assembly, L represents an arc length of the bottom plate 300 in the first direction, and P represents a distance between the two adjacent columns of point light sources 200.

Alternatively, the step of controlling the states of the point light sources 200 of the light-emitting assembly at different regions of the bottom plate 300 includes controlling on and off states of the point light sources 200 of the light-emitting assembly at different regions of the bottom plate 300 in accordance with the curved surface of the curved-surface display panel 100, so that the number of the point light sources 200 of the light-emitting assembly in the on state increases gradually from a middle region to a peripheral region of the bottom plate 300 in the first direction.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A backlight module for providing a light source for a curved-surface display panel, comprising:
   an optical assembly at a side of a light-entering surface of the curved-surface display panel;
   a light-emitting assembly at a side of the optical assembly away from the curved-surface display panel, and including a plurality of point light sources on a bottom plate; and
   a control mechanism configured to control states of the point light sources of the light-emitting assembly at different regions of the bottom plate, so as to gradually change output light amounts of the light-emitting assembly at different regions of the bottom plate in accordance with a curved surface of the curved-surface display panel.

2. The backlight module according to claim 1, wherein the curved-surface display panel has a curved surface curved in a first direction, and distances between the curved-surface display panel and the light-emitting assembly increase gradually from a middle portion of the curved-surface display panel to a peripheral portion of the curved-surface display panel in the first direction, and
   the control mechanism is configured to control light-emitting states of the point light sources of the light-emitting assembly at different regions of the bottom plate in accordance with the curved surface of the curved-surface display panel, so that light intensities of the light-emitting assembly increase gradually from a middle region to a peripheral region of the bottom plate in the first direction.

3. The backlight module according to claim 2, wherein the control mechanism is configured to control driving currents applied to the point light sources of the light-emitting assembly at different regions of the bottom plate in accordance with a curvature radius of the curved-surface display panel and a predetermined correspondence, so that the driving currents applied to the point light sources of the light-emitting assembly increase gradually from the middle region to the peripheral region of the bottom plate in the first direction.

4. The backlight module according to claim 3, wherein the plurality of point light sources is arranged in a matrix form, the point light sources in the first direction are arranged symmetrically on the bottom plate in N columns, and the control mechanism is configured to control the driving currents for the point light sources in an $n^{th}$ column and an $(N-n+1)^{th}$ column in accordance with the curvature radius of the curved-surface display panel and the predetermined correspondence using an equation $$I_n = I_{(N-n+1)} = \left(1 + \frac{\sqrt{\left(R*\sin^{-1}\frac{\left(\frac{L}{2}-r\right)}{R}\right)^2 - \left(\frac{L}{2}-r\right)^2}}{H}\right)*I_0,$$

where n represents a serial number of the column in which the point light sources are located in the first direction and which is counted from a first edge of the bottom plate, R represents the curvature radius of the curved-surface display panel, r represents a distance between the point light sources in the $n^{th}$ column and the first edge of the bottom plate in the first direction, $I_n$ represents the driving current applied to the point light sources in the $n^{th}$ column, $I_{(N-n+1)}$ represents the driving current applied to the point light sources in the $(N-n+1)^{th}$ column $I_0$ represents the driving current applied to the point light source corresponding to a point of the curved-surface display panel closest to the light-emitting assembly, H represents a distance between the light-emitting assembly and the point of the curved-surface display panel closest to the light-emitting assembly, and L represents a length of the bottom plate in the first direction.

5. The backlight module according to claim 4, wherein the plurality of point light sources is arranged on the bottom plate in a matrix form and spaced apart from each other at an identical interval, a distance between each of the point light sources in a first column or an $N^{th}$ column and a corresponding edge of the bottom plate in the first direction is P/2, P represents a distance between the two adjacent columns of point light sources, and the control mechanism is configured to control the driving currents for the point light sources in the $n^{th}$ column and the $(N-n+1)^{th}$ column in accordance with the curvature radius of the curved-surface display panel and the predetermined correspondence using an equation $$I_n = I_{(N-n+1)} = \left(1 + \frac{\sqrt{\left(R*\sin^{-1}\frac{\left(\frac{L}{2}-(n-1)p-\frac{p}{2}\right)}{R}\right)^2 - \left[\frac{L}{2}-(n-1)p-\frac{p}{2}\right]^2}}{H}\right)*I_0,$$

where n represents a serial number of the column in which the point light sources are located in the first direction and which is counted from the first edge of the bottom plate, R represents the curvature radius of the curved-surface display panel, $I_n$ represents the driving current applied to the point light sources in the $n^{th}$ column, $I_{(N-n+1)}$ represents the driving current applied to the point light sources in the $(N-n+1)^{th}$ column, $I_0$ represents the driving current applied to the point light source at a position corresponding to the point of the curved-surface display panel closest to the light-emitting assembly, H represents a distance between the light-emitting assembly and the point of the curved-surface display panel closest to the light-emitting assembly, and L represents a length of the bottom plate in the first direction.

6. The backlight module according to claim 1, wherein the curved-surface display panel has a curved surface curved in a first direction, and distances between the curved-surface display panel and the light-emitting assembly increase gradually from a middle portion of the curved-surface display panel to a peripheral portion of the curved-surface display panel in the first direction, and
the control mechanism is configured to control on and off states of the point light sources of the light-emitting assembly at different regions of the bottom plate in accordance with the curved surface of the curved-surface display panel, so that the number of the point light sources of the light-emitting assembly in the on state increases gradually from a middle region to a peripheral region of the bottom plate in the first direction.

7. The backlight module according to claim 1, wherein the curved-surface display panel has a curved surface curved in a first direction, and distances between the curved-surface display panel and the light-emitting assembly decrease gradually from a middle portion of the curved-surface display panel to a peripheral portion of the curved-surface display panel in the first direction, and
the control mechanism is configured to control light-emitting states of the point light sources of the light-emitting assembly at different regions of the bottom plate in accordance with the curved surface of the curved-surface display panel, so that light intensities of the light-emitting assembly decrease gradually from a middle region to a peripheral region of the bottom plate in the first direction.

8. A light source adjustment method for the backlight module according to claim 1, comprising a step of controlling states of point light sources of a light-emitting assembly at different regions of a bottom plate, so as to gradually change output light amounts of the light-emitting assembly at different regions in accordance with a curved surface of a curved-surface display panel.

9. The light source adjustment method according to claim 8, wherein the step of controlling the states of the point light sources of the light-emitting assembly at different regions of the bottom plate comprises:
in the case that the curved-surface display panel has a curved surface curved in a first direction, and distances between the curved-surface display panel and the light-emitting assembly increase gradually from a middle portion of the curved-surface display panel to a peripheral portion of the curved-surface display panel in the first direction, controlling light-emitting states of the point light sources of the light-emitting assembly at different regions of the bottom plate in accordance with the curved surface of the curved-surface display panel, so that light intensities of the light-emitting assembly increase gradually from a middle region to a peripheral region of the bottom plate in the first direction.

10. The light source adjustment method according to claim 9, wherein the step of controlling the light-emitting states of the point light sources of the light-emitting assembly at different regions of the bottom plate in accordance with the curved surface of the curved-surface display panel comprises:
controlling driving currents applied to the point light sources of the light-emitting assembly at different regions of the bottom plate in accordance with a curvature radius of the curved-surface display panel and a predetermined correspondence, so that the driving currents applied to the point light sources of the light-emitting assembly increase gradually from the middle region to the peripheral region of the bottom plate in the first direction.

11. The light source adjustment method according to claim 10, wherein the step of controlling the driving currents applied to the point light sources of the light-emitting assembly at different regions of the bottom plate in accordance with the curvature radius of the curved-surface display panel and the predetermined correspondence comprises:
controlling the driving currents for the point light sources in an $n^{th}$ column and an $(N-n+1)^{th}$ column in accordance with the curvature radius of the curved-surface display panel and the predetermined correspondence using an equation $$I_n = I_{(N-n+1)} = \left(1 + \frac{\sqrt{\left(R*\sin^{-1}\frac{\left(\frac{L}{2}-r\right)}{R}\right)^2 - \left(\frac{L}{2}-r\right)^2}}{H}\right)*I_0,$$

where n represents a serial number of the column in which the point light sources are located in the first direction and which is counted from a first edge of the bottom plate, R represents the curvature radius of the curved-surface display panel, r represents a distance between the point light sources in the $n^{th}$ column and the first edge of the bottom plate in the first direction, $I_n$ represents the driving current applied to the point light sources in the $n^{th}$ column, $I_{(N-n+1)}$ represents the driving current applied to the point light sources in the $(N-n+1)^{th}$ column, $I_0$ represents the driving current applied to the point light source at a position corresponding to a point of the curved-surface display panel closest to the light-emitting assembly, H represents a distance between the light-emitting assembly and the point of the curved-surface display panel closest to the light-emitting assembly, and L represents a length of the bottom plate in the first direction.

12. The light source adjustment method according to claim 11, wherein the driving currents for the point light sources in the $n^{th}$ column and the $(N-n+1)^{th}$ column is controlled in accordance with the curvature radius of the curved-surface display panel and the predetermined correspondence with an equation $$I_n = I_{(N-n+1)} =$$
$$\left(1 + \frac{\sqrt{\left(R*\sin^{-1}\frac{\left(\frac{L}{2}-(n-1)p-\frac{p}{2}\right)}{R}\right)^2 - \left[\frac{L}{2}-(n-1)p-\frac{p}{2}\right]^2}}{H}\right)*I_0,$$

where n represents a serial number of the column in which the point light sources are located in the first direction and which is counted from the first edge of the bottom plate, R represents the curvature radius of the curved-surface display panel, $I_n$ represents the driving current applied to the point light sources in the $n^{th}$ column, $I_{(N-n+1)}$ represents the driving current applied to the point light sources in the $(N-n+1)^{th}$ column, $I_0$ represents the driving current applied to the point light source at a position corresponding to the point of the curved-surface display panel closest to the light-emitting assembly, H represents a distance between the light-emitting assembly and the point of the curved-surface display panel closest to the light-emitting assembly, L represents a length of the bottom plate in the first direction, and P represents a distance between the two adjacent columns of point light sources.

13. The light source adjustment method according to claim 10, wherein the step of controlling the states of the point light sources of the light-emitting assembly at different regions of the bottom plate comprises:
controlling on and off states of the point light sources of the light-emitting assembly at different regions of the bottom plate in accordance with the curved surface of the curved-surface display panel, so that the number of the point light sources of the light-emitting assembly in the on state increases gradually from a middle region to a peripheral region of the bottom plate in the first direction.

14. The light source adjustment method according to claim 8, wherein the step of controlling the states of the point light sources of the light-emitting assembly at different regions of the bottom plate comprises:
in the case that the curved-surface display panel has a curved surface curved in a first direction, and distances between the curved-surface display panel and the light-emitting assembly decrease gradually from a middle portion of the curved-surface display panel to a peripheral portion of the curved-surface display panel in the first direction, controlling light-emitting states of the point light sources of the light-emitting assembly at different regions of the bottom plate in accordance with the curved surface of the curved-surface display panel, so that light intensities of the light-emitting assembly decrease gradually from a middle region to a peripheral region of the bottom plate in the first direction.

15. A curved-surface display device comprising a curved-surface display panel and the backlight module according to claim 1.

* * * * *